United States Patent
Viorel et al.

(10) Patent No.: US 11,818,758 B1
(45) Date of Patent: *Nov. 14, 2023

(54) ASSISTED RANDOM ACCESS PROCEDURE FOR NR-U

(71) Applicant: CABLE TELEVISION LABORATORIES, INC., Louisville, CO (US)

(72) Inventors: Dorin Gheorghe Viorel, Erie, CO (US); Balkan Kecicioglu, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/461,661

(22) Filed: Aug. 30, 2021

Related U.S. Application Data (63) Continuation of application No. 16/563,640, filed on Sep. 6, 2019, now Pat. No. 11,109,409.

(60) Provisional application No. 62/799,969, filed on Feb. 1, 2019, provisional application No. 62/758,760, filed on Nov. 12, 2018, provisional application No. 62/744,103, filed on Oct. 10, 2018.

(51) Int. Cl.
| | |
|---|---|
| *H04W 76/10* | (2018.01) |
| *H04W 74/08* | (2009.01) |
| *H04W 16/14* | (2009.01) |
| *H04W 74/00* | (2009.01) |
| *H04W 84/12* | (2009.01) |
| *H04W 84/04* | (2009.01) |

(52) U.S. Cl.
CPC ....... *H04W 74/0808* (2013.01); *H04W 16/14* (2013.01); *H04W 74/004* (2013.01); *H04W 84/042* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2018/0332620 | A1* | 11/2018 | Malladi | H04W 16/28 |
| 2019/0158333 | A1* | 5/2019 | Zhang | H04L 5/0048 |
| 2019/0174449 | A1* | 6/2019 | Shan | H04W 60/00 |
| 2019/0174466 | A1* | 6/2019 | Zhang | H04L 5/0057 |
| 2019/0387546 | A1* | 12/2019 | Li | H04L 27/26132 |

(Continued)

*Primary Examiner* — Brandon M Renner
(74) *Attorney, Agent, or Firm* — Cozen O'Connor (57) ABSTRACT

An assisted random-access procedure allows band sharing between New Radio Unlicensed (NR-U) and Wi-Fi to improve coexistence of NR-U and Wi-Fi in shared unlicensed bands (e.g., below 7 GHz). To connect to an NR-U network, NR-U User Equipment (UE) receives and decodes an NR-U preamble of an NR-U wireless transmission to determine NR-U channel occupancy time (COT). The NR-U UE detects Wi-Fi wireless transmissions and decodes a Wi-Fi preamble to determine Wi-Fi COT. A random access (RA) opportunity is acquired based upon the NR-U wireless transmission and the NR-U COT. When the RA opportunity is not during the Wi-Fi COT, a PRACh message is transmitted from the NR-U UE to a NR-U base station (gNB) to allow the NR-U UE to join the NR-U network. NR-U transmissions may include an NR-U common preamble that may be decoded by existing Wi-Fi devices to avoid collisions with NR-U wireless transmissions.

13 Claims, 4 Drawing Sheets

(56) References Cited

U.S. PATENT DOCUMENTS

| | | | |
|---|---|---|---|
| 2020/0037354 A1* | 1/2020 | Li | H04W 74/0808 |
| 2020/0045733 A1* | 2/2020 | Tiirola | H04W 74/0808 |
| 2020/0100284 A1* | 3/2020 | Li | H04W 74/0808 |
| 2020/0146062 A1* | 5/2020 | Xu | H04W 72/23 |
| 2020/0154283 A1* | 5/2020 | Yerramalli | H04L 5/0023 |
| 2020/0336987 A1* | 10/2020 | Mukherjee | H04W 74/0808 |

* cited by examiner

Figure.1. Structure of 802.11a preamble

ASSISTED RANDOM ACCESS PROCEDURE FOR NR-U

RELATED APPLICATIONS

This application is a continuation of U.S. patent application Ser. No. 16/563,640, filed Sep. 6, 2019, which claims priority to U.S. patent application Ser. No. 62/744,103, filed Oct. 10, 2018, to U.S. patent application Ser. No. 62/758,760, filed Nov. 12, 2018, and to U.S. patent application Ser. No. 62/799,969, filed Feb. 1, 2019, each of which is incorporated in its entirety herein by reference.

BACKGROUND

The 3rd Generation Partnership Project (3GPP) unites telecommunications standard development organizations (e.g., ARIB, ATIS, CCSA, ETSI, TSDSI, TTA, TTC) to collectively define cellular telecommunications network technologies, including radio access, the core transport network, and service capabilities. 3GPP specifications and studies are contribution-driven, by member companies, in Working Groups and at the Technical Specification Group level, and include defining 5th generation new radio in unlicensed bands (5G NR-U). The initial phase of this collaboration to define 5G NR-U focuses on unlicensed bands below 7 GHz, over which 802.11n, 802.11ac and 802.11ax technologies will coexist with 5G NR-U.

SUMMARY

The present description and figures describe and show Wi-Fi and 5G's New Radio Unlicensed in the examples and embodiments, although these are merely to ease understanding and not meant to be limiting in any way. The present systems and methods may be applied to any two or more technologies or protocols that co-exist in an unlicensed band. As such, wherever "Wi-Fi device", "Wi-Fi protocol", or the like is shown it may also be read as "a first wireless device", a "first wireless protocol", or the like. Further, wherever "NR-U device" (such as gNodeB, NR-U UE, etc.), "NR-U protocol", or the like is shown it may also be read as "a second wireless device", a "Second wireless protocol", or similar.

One aspect of the present embodiments includes the realization that to share a portion of the unlicensed bands (e.g., below 7 GHz, such as 5 GHz and 6 GHz, and millimeter wave, such as but not limited to 60 GHz) used by wireless systems in the unlicensed band, such as but not limited to Wi-Fi and 5G New Radio Unlicensed. Wi-Fi and new radio in unlicensed bands (NR-U) nodes (e.g., NR-U base stations (gNBs) and NR-U user equipment (UE)) must be aware of Wi-Fi use of that band to avoid transmission collisions. Also, NR-U UE attempts to join an NR-U network could be delayed due to the coexistent Wi-Fi traffic. The present embodiments solve this problem by decoding, within the gNB and NR-U UE, Wi-Fi channel occupancy time (COT) information of Wi-Fi transmissions to determine opportunities to transmit. Advantageously, by decoding Wi-Fi COT from Wi-Fi transmission, collisions of NR-U and Wi-Fi transmissions are reduced and transmission failure minimized and coexistence of NR-U and Wi-Fi in the same unlicensed bands is improved.

Another aspect of the present embodiments includes the realization that it would be useful for Wi-Fi nodes to be aware of NR-U transmissions. The present embodiments solve this problem by including a Wi-Fi preamble (also named 'common' preamble since it may be used by two multiple access technologies) in the NR-U waveform of the NR-U transmissions such that a Wi-Fi node may also decode NR-U transmissions. Advantageously, by including a Wi-Fi preamble in the NR-U waveform, coexistence of 5G NR-U and Wi-Fi in the same unlicensed bands (e.g., below 7 GHz) is facilitated through improved cooperation and awareness. Further, a reserved bit in the Wi-Fi preamble may be used to indicate when a transmission is from an NR-U node as compared to when the transmission is from a Wi-Fi node.

In one embodiment, an assisted random-access procedure allows New Radio Unlicensed (NR-U) to share a band with Wi-Fi. NR-U User Equipment (UE) receives an NR-U wireless transmission and decodes the NR-U wireless transmission to determine an NR-U channel occupancy time (COT). The NR-U UE detects a Wi-Fi wireless transmission including a Wi-Fi preamble and decodes the Wi-Fi preamble to determine a Wi-Fi COT. A random access (RA) opportunity is acquired based upon the NR-U wireless transmission, and a PRACh message is transmitted, during the RA opportunity, from the NR-U UE to a NR-U base station (gNB) when (a) the RA opportunity does not occur during the NR-U COT or the Wi-Fi COT, or when (b) the NR-U COT is from the gNB and the RA opportunity occurs within a remainder of the NR-U COT, and the RA opportunity does not occur within the Wi-Fi COT.

In another embodiment, an assisted random-access procedure supports band sharing between New Radio Unlicensed (NR-U) and Wi-Fi. An NR-U base station (gNB) generates NR-U transmission data that includes an NR-U common preamble having, at least in part, a Wi-Fi preamble format. A reserved bit of the Wi-Fi preamble format is set to indicate that the NR-U common preamble is generated by the gNB, and the NR-U transmission data is transmitted from the gNB.

In another embodiment, a software product includes instructions stored on computer-readable media, wherein the instructions, when executed by a processor of a New Radio Unlicensed (NR-U) User Equipment (UE), perform steps for an assisted random-access procedure for band sharing between NR-U and Wi-Fi. The software product includes instructions for receiving, by the NR-U UE, an NR-U wireless transmission; instructions for decoding the NR-U wireless transmission to determine an NR-U channel occupancy time (COT); instructions for detecting, by the NR-U UE, a Wi-Fi wireless transmission including a Wi-Fi preamble; instructions for decoding the Wi-Fi preamble to determine a Wi-Fi COT; instructions for acquiring a random access (RA) opportunity based upon the NR-U wireless transmission; and instructions for transmitting, during the RA opportunity, a PRACh message from the NR-U UE to an NR-U base station (gNB) when (a) the RA opportunity does not occur during either of the NR-U COT and the Wi-Fi COT, or when (b) the NR-U COT is from the gNB and the RA opportunity occurs within a remainder of the NR-U COT, and the RA opportunity does not occur within the Wi-Fi COT.

DETAILED DESCRIPTION OF THE EMBODIMENTS

Figure 1:
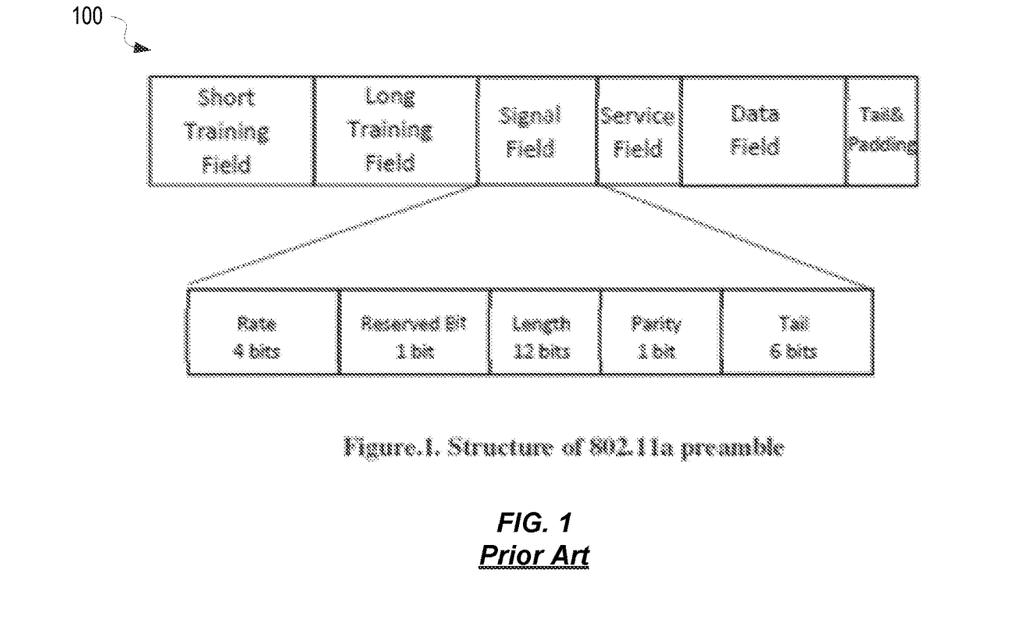
FIG. 1 shows structure of the prior art Wi-Fi preamble.

For backward compatibility, all Wi-Fi generations use at least the legacy 802.11a Wi-Fi preamble, and therefore, the 802.11a Wi-Fi preamble may be decoded by all Wi-Fi technologies currently deployed in the field. FIG. 1 shows the prior art structure of the Wi-Fi preamble 100, which includes one reserved bit, allocated for future use, in the signal field.

To access an NR-U stand-alone network, a NR-U user device (UE) must announce its intent to join the network by transmitting, via a physical random-access channel (PRACH), a message that includes a random-access preamble, hereinafter referred to as PRACh message (e.g., PRACh Mssg1). Use of the asynchronous PRACH channel is known from Long Term Evolution (LTE) networks; however, PRACH has not been initially designed for operation where two distinct network protocols coexist in the same unlicensed band. For example, the PRACh message does not include information about the duration of the burst or the destination. Further, PRACh messages of either LTE or NR-U protocols are only decodable by 3GPP LTE or NR devices, respectively, since the frame structure is different from other protocols, such as Wi-Fi.

One problem arising for 5G NR-U user devices (e.g., NR-U UEs) operating in a shared unlicensed band, is that initial access to the 5G NR-U network requires an NR-U UE to transmit a Random Access (RA) message on the PRACh to identify itself (e.g., indicate that it wants to connect to the 5G NR-U network) to a 5G NR-U base station (gNB). However, to be able to transmit the RA message on the PRACh, the NR-U UE requires to get access to the air interface, as scheduled by the serving gNB. Since the air interface could be busy due to the coexistent Wi-Fi traffic, the NR-U UE shall understand when the air interface become available. The NR-U UE receives NR-U channel occupancy time (COT) information for the 5G NR-U networks operating in the area, on the same unlicensed channel, which is broadcast by the neighboring gNBs, to determine a time availability (Ta) for the PRACh. For example, the NR-U COT may be used to determine when no other NR-U transmission are scheduled. However, when operating in an area where the unlicensed band is shared with Wi-Fi, Wi-Fi transmissions may occur when no NR-U transmission is scheduled, and the NR-U UE cannot calculate the Ta from Wi-Fi transmissions. However, the NR-U UE may transmit when it knows that there is a PRACh transmission opportunity (allocated by the gNB). By detecting the surrounding Wi-Fi nodes preambles, the NR-U UE may calculate a next available time for the PRACh transmission (e.g., when no Wi-Fi transmissions will occur during the Ta interval).

The NR-U UE attempting to access an NR-U stand-alone (SA) network needs the COT information; however, since the NR-U UE is not yet attached to the gNB, detecting the NR-U COT is difficult. For example, the NR-U UE attempts to receive COT information from a PBCH message (broadcast) and by decoding common PDCCH channel transmissions. Where the band is shared, such as with Wi-Fi, each network transmits its own COT, thereby making PRACh opportunities advertised to the NR-U UE potentially unusable due to collisions over the air between the two co-existing access networks.

The embodiments described herein provide a mechanism for optimized PRACh functionality for NR-U access technology that also supports fair coexistence with Wi-Fi nodes.

Figure 2:
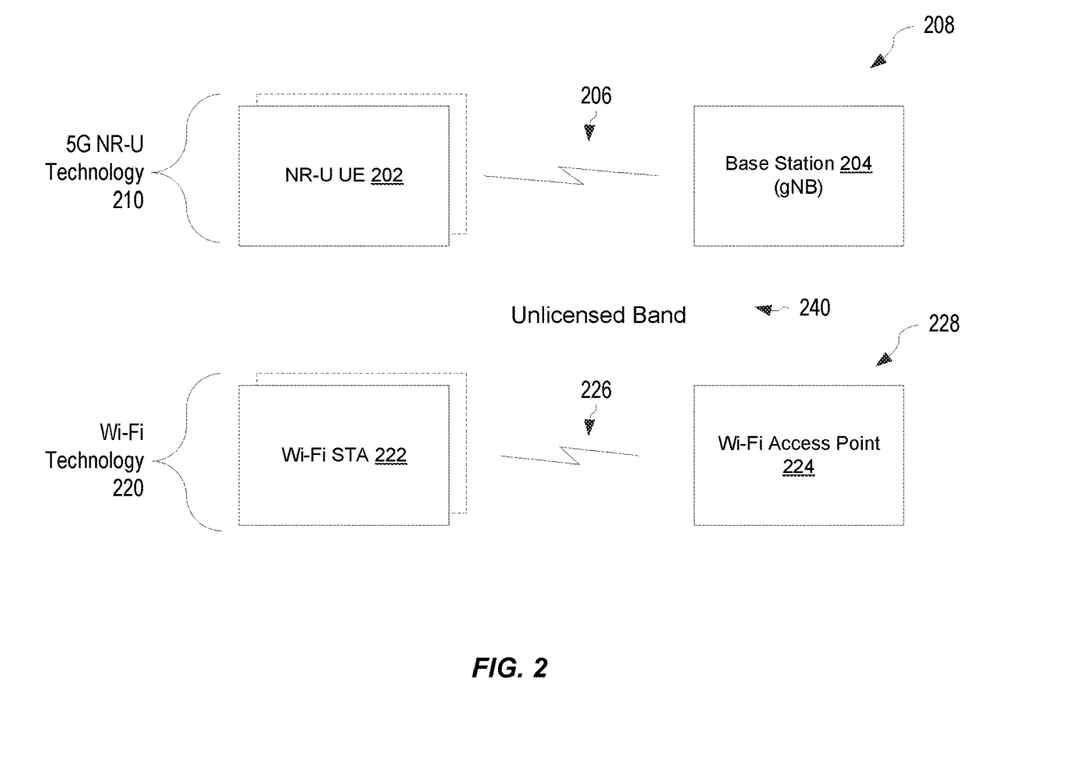
FIG. 2 is a functional block diagram illustrating 5G NR-U technology sharing an unlicensed band with Wi-Fi technology, in an embodiment.

FIG. 2 is a functional block diagram illustrating 5G NR-U technology 210 sharing an unlicensed band 240 (e.g., below 7 GHz) with Wi-Fi technology 220. 5G NR-U technology 210 may include at least one NR-U user equipment (UE) 202 communicating with an NR-U base station 204 (often referred to as a next generation node B (gNB)) using a 5G NR-U access network 206 to form a 5G NR-U network 208. Wi-Fi technology 220 may include at least one Wi-Fi station (STA) 222 communicating with a Wi-Fi access point (AP) 224 using a Wi-Fi access network 226 that forms a Wi-Fi network 228. 5G NR-U access network 206 and Wi-Fi access network 226 share the same unlicensed band 240 such that NR-U network 208 and Wi-Fi network 228 may coexist in the same area.

For two different protocols (e.g., access technologies) to share the same unlicensed band, a key mechanism to prevent signal collision is listen-before-talk (LBT). LBT may be implemented by sensing the received energy level over the air interface (e.g., using a clear channel assessment (CCA)), or by searching for a preamble that may include a known training or synchronization signal. These two approaches may be referred to as energy detection (ED) and preamble detection (PD), respectively. PD based channel sensing may provide an effective way of controlling channel access, since the preamble may include control signaling (transmitted by a known source) that provides useful information about transmitting and receiving entities in addition to information of the signal being transmitted (e.g., burst information).

One aspect of the embodiments described herein include the realization that it would be advantageous for both the existing Wi-Fi and 5G NR-U to properly decode at least some of the control signals of the other protocol to facilitate coexistence of 5G NR-U with Wi-Fi in the unlicensed bands (e.g., below 7 GHz). The present embodiments solve this problem by configuring 5G NR-U nodes (e.g., gNB and NR-U UEs) to use a new preamble that incorporates the Wi-Fi preamble 100 (e.g. 802.11a as shown in FIG. 1), as this allows cross detection of common preambles between Wi-Fi and 5G NR-U, thereby improving the coexistence of Wi-Fi and 5G NR-U in the same band.

The new 5G NR-U common preamble is adapted to the deployed environment (e.g., the shared unlicensed band 240) by incorporating the Wi-Fi preamble in the new 5G NR-U preamble. Similarity of the preambles allows cross detection of this common preamble between Wi-Fi and 5G NR-U technologies and thereby provide a better coexistence of 5G NR-U technology 210 and Wi-Fi technology 220, since devices using the same common preamble are aware of all other similar devices sharing the band, and not just devices using their protocol.

To make the most use of the common Wi-Fi preamble, it would be useful for an NR-U device to understand whether the received preamble originated from an NR-U node or from a Wi-Fi node. An NR-U device may use this information to enter a sleep mode (or Discontinued Receive mode—DRx) to save power when the received preamble is from a Wi-Fi node, during the COT as signaled by the preamble transmitted by the Wi-Fi node taking over the air interface, when the NR-U device is sensing the channel for transmission. The NR-U device may also use this information to stop the reception during the advertised COT to save power when the transmission is from a Wi-Fi node, and to enter the sleep (DRx) mode when the transmission is from another NR-U node assigned to a different coexistent NR-U network and not intended for the NR-U device sensing the channel.

In certain embodiments, the reserved bit in the signal field of the 802.11a preamble, shown in FIG. 1, may be used to indicate when the received 802.11a preamble originated from an NR-U node or from a Wi-Fi node. The Wi-Fi protocol 802.11a sets a value of the reserved bit to zero. To differentiate, the 5G NR-U protocol could set the value of the reserved bit to one, for example. Thus, any receiving 5G NR-U device may determine whether the transmission is from a Wi-Fi device or from a 5G NR-U device.

Certain deployments of 5G NR-U may not require coexistence with Wi-Fi, such as when 5G NR-U is used in tightly controlled enterprise environments or when Wi-Fi access points are sparse or not used in the deployment area. Accordingly, it may be advantageous to dynamically include the common preamble (such as 802.11a or 802.11ax) in the new 5G NR-U waveform, depending on the deployment or when channel measurements indicate coexistence. This dynamic control of the preamble may be achieved as described below. Advantageously, where a dedicated circuit searches for the common preamble (such as 802.11a or 802.11ax preamble), the dynamic control of the preamble allows that circuit to be completely turned off (and/or that portion of signal processing may be skipped) to reduce computation complexity. This dynamic control may also simplify the MAC protocol procedures, since there are fewer possible states. The dynamic control allows the common preamble (such as 802.11a or 802.11ax preamble) to be switched off when not needed, thereby also reducing the consumption of power of the respective node.

In one embodiment, a 5G gNB (e.g., a 5G NR-U base station) may indicate, in system information broadcast as part of the SIB messages or SSB broadcast messages, whether the common preamble (such as 802.11a or 802.11ax) should be included in the 5G NR-U waveform.

In another embodiment, a 5G gNB may indicate, via upper layer control plane messaging, to a specific set of NR-U UEs (e.g., NR-U UE 202) that the 802.11 preamble should semi-statically be included in the 5G NR-U waveform. That is, the specific set of NR-U UEs will include the common preamble until revoked by a following related control message. In 3GPP, semi-static may be associated with SIB control messages. Data grant send with PDCCH is an example of dynamic configuration. In some embodiments, the common preamble allocation for an NR-U node may be done semi-statically using SIB control messages, or dynamically, using PDCCh messages.

In another embodiment, a 5G gNB may send semi-static (such as SIB) or dynamic (such as PDCCh) configuration messages to turn on the common preamble (such as the 802.11a/ax preambles) monitoring in radio measurements and to configure NR-U UEs to include the common preamble in transmissions when triggered by the measurements. In this way, the 5G gNB may configure NR-U UEs to ignore or to increase the detection threshold of the common preambles when the received signal strength from these measurements are below a given threshold. This may also be co-related to the NR-U UE transmit power. The transmission power of the NR-U UE is controlled depending on the proximity to the base station. An NR-U UE that is located at an edge of a cell requires a higher transmission power for its signal to reach the base station. Accordingly, an NR-U UE at the edge of the cell may cause more interference to overlapping or neighboring nodes (e.g., both base station and other mobile users). This behavior may be altered by the proximity of a hidden node transmitting a common preamble. In these cases, the channel access mechanism may be designed to be more sensitive or insensitive to other transmissions. For example, the base station may configure an NR-U UE to ignore other transmissions completely when it is close to the associated base station or a hidden node.

Figure 3:
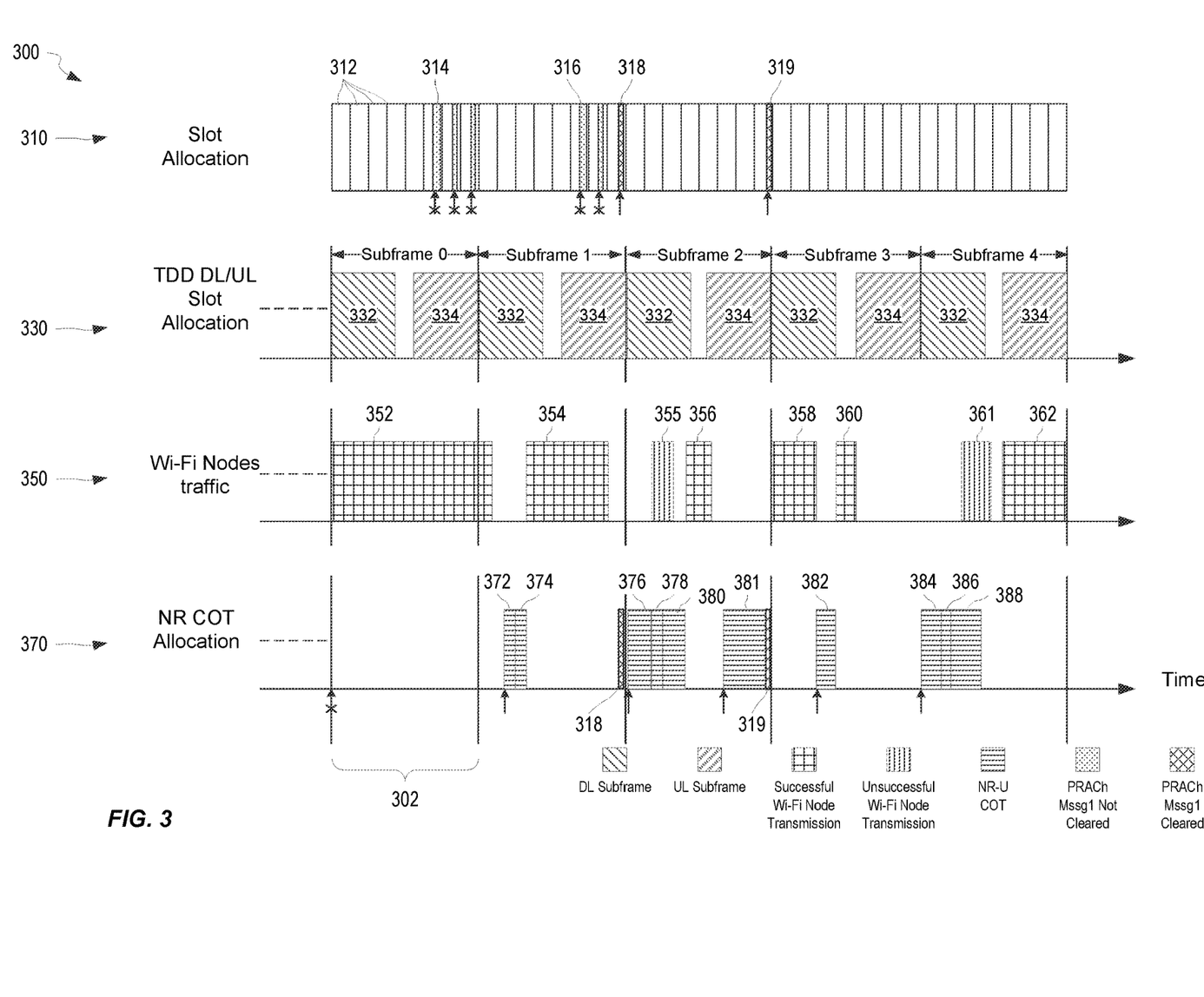
FIG. 3 shows four example timelines illustrating physical aspects of transmissions in an unlicensed band shared between 5G NR-U and Wi-Fi, in an embodiment.

FIG. 3 shows four example timelines illustrating physical aspects of transmissions in an unlicensed band shared between 5G NR-U and Wi-Fi. The symbol allocation per subframe 302 is shown in timeline 310, the intended NR-U time division duplexing (TDD) of uplink (UL) and downlink (DL) allocation is shown in timeline 330, the coexistent Wi-Fi traffic (time allocation) is shown in timeline 350, and resulting NR-U COT allocation is shown in timeline 370. Time is represented along the horizontal x-axis and timelines 310, 330, 350, and 370 are time aligned. The NR-U subframe (sub 7 GHz) is composed by $2\mu$ slots per subframe, where $\mu=1$, 2 or 4 (SSC=15/30/60 kHz).

Timeline 350 shows one example of Wi-Fi traffic, where each block 352, 354, 356, 358, 360, and 362, represents intended Wi-Fi transmissions. Clear channel assessment (CCA) is performed at the start of each block 352, 354, 355, 356, 358, 360, 361, and 362, prior to transmission. In the case of intended transmissions indicated by blocks 355 and 361, the CCA did not indicate a clear channel, and therefore Wi-Fi transmission backed off (e.g., until blocks 356 and 362, respectively).

Timeline 330 shows one example of an intended NR-U DL allocation 332 and UL allocation 334 for each subframe 302 of the 5G NR-U network 208. The time ratio of DL allocation 332 and UL allocation 334 is configurable for the 5G NR-U network 208. Intended DL allocation 332 and intended UL allocation 334 indicate where downlink transmissions (gNB to UE) and uplink transmission (UE to gNB) may be allocated, however, actual allocation of NR-U COT in timeline 370 shows where the actual transmission occurs because of coexistent Wi-Fi traffic shown in timeline 350.

Timeline 310 shows each subframe 302 divided into eight slots 312, where gNB and NR-U UE may initiate transmission in an unoccupied symbol, based upon rules indicated below. A device (e.g., gNB 204 and NR-U UE 202) intending to transmit, executes a CCA (e.g., attempting detection of ED and/or PD) to detect Wi-Fi transmissions, and each transmission includes a preamble (e.g. 802.11a, 802.11ax or a new NR specific preamble) (gNB—Tx/Rx and the UE RX or Tx/Rx).

Transmissions by gNB 204 may include 5G NR-U COT information in the common preamble. It is understood that a common preamble may entirely include an 802.11a, 802.11n. 802.11ac or 802.11ax preamble or may include only the basic 802.11a part beside other functionality.

Advantageously, each NR-U UE 202 not yet attached to the network may decode COT duration from the preamble transmitted by gNB 204, and Wi-Fi COT duration from received Wi-Fi transmissions, by decoding the related 802.11 preamble. Further, each NR-U UE 202 may decode the direction of transmission from NR common preambles and may decode the Random Access (RA) opportunity (e.g. SIB1) from the related gNB transmissions. NR-U UE 202 transmits a PRACh Mssg 1 on the first available symbol dedicated for a PRACh transmission, which complies simultaneously with all the following conditions: it is not part of a gNB DL transmission in a given COT, it is not part of a coexistent Wi-Fi COT, and it is part of a RA opportunity supported by the gNB.

Timeline 370 shows NR-U COT allocation. For example, gNB 204 successfully allocates NR-U COT 372, 374, 376, 378, 380, 382, 384, 386 and 388 for downlink transmissions, and allocates NR-U COT 381 for an uplink transmission. As discussed above, gNB 204 may receive the Wi-Fi preamble 100 and decode it to determine a length of each Wi-Fi block 352, 354, 356, 358, 360, and 362. Following a successful CCA procedure, gNB 204 may generate actual NR-U COT 372, 374, 376, 378, 380, 381, 382, 384, 386 and 388 without conflict with Wi-Fi transmissions. Similarly, since existing Wi-Fi STAs 222 and Wi-Fi APs 224 may recognize the Wi-Fi preamble within 5G NR-U transmission, Wi-Fi STAs 222 and Wi-Fi APs 224 may successfully coexist with 5G NR-U networks (e.g., 5G NR-U network 208).

In the example of FIG. 3, to join the 5G NR-U network 208, NR-U UE 202 must send PRACh message to gNB 204. As shown in timeline 310, a first identified PRACh message opportunity 314 is identified, but CCA by NR-U UE 202 indicates that the channel is already occupied (e.g., by Wi-Fi traffic of block 352), and therefore NR-U UE 202 cannot transmit, resulting in the PRACh message not being cleared. Immediately subsequent attempts are also not cleared, and therefore NR-U UE 202 waits for a future PRACh message opportunity 316. In this example, the PRACh message is again not cleared at opportunity 316 because the channel is already occupied (e.g., by Wi-Fi block 354), but NR-U UE 202 was not aware of the Wi-Fi transmission; however, the PRACh message 318 is cleared, and through analysis of the preamble of Wi-Fi traffic, a corresponding NR-U COT allocation 376 occurs since there is no Wi-Fi traffic. Where NR-U UE 202 receives Wi-Fi block 354 and decodes the Wi-Fi preamble, NR-U UE 202 may learn of the channel occupancy and CCA at opportunity 316 is not attempted and NR-U UE 202 waits until opportunity 318. A subsequent PRACh message 319 (e.g., by another UE wishing to join the 5G NR-U network 208) is cleared at an unused portion of NR-U COT 381, and through analysis of the preamble of Wi-Fi traffic, a corresponding NR-U COT allocation 382 occurs after Wi-Fi traffic in block 358.

Continuing with the example of FIG. 3, in certain embodiments where Wi-Fi nodes (e.g., Wi-Fi STA 222 and/or Wi-Fi access point 224) decode the NR-U common preamble, timeline 350 further shows how the example of Wi-Fi traffic is complimentary with the NR-U COT Allocations shown in timeline 370. By decoding the NR-U common preamble, Wi-Fi nodes may determine durations of NR-U COTs 372, 374, 376, 378, 380, 381, 382, 384, 386, and 388, and thereby determine when transmission may start without requiring the use of CCA procedures (ED/PD threshold detection). In the example of FIG. 3, the NR-U common preamble may indicate when NR-U COT 374 ends and thereby when the Wi-Fi COT (e.g., Wi-Fi traffic) indicated by block 354 may start. Similarly, the Wi-Fi COT indicated by block 356 may follow NR-U COT 378, and the Wi-Fi COT indicated by block 360 may follow NR-U COT 382, wherein the NR-U common preamble allows Wi-Fi transmissions to start without requiring the use of CCA procedures.

In the example of FIG. 3, NR-U COT allocations 376, 378, and 380 follow successful CCA procedures. NR-U COTs 372, 374, 376, 378, 380, 382, 384, 386, and 388 are used to transmit DL data from the gNB to the UEs, following the proper CCA procedure and the related allocation provided previously by the gNB. NR-U COT allocation 381 is used to transmit UL data from an NR-U UE to the gNB, however, as noted above, an unused portion of NR-U COT 381 is used for PRACh message 319 without needing the CCA procedure.

Figure 4:
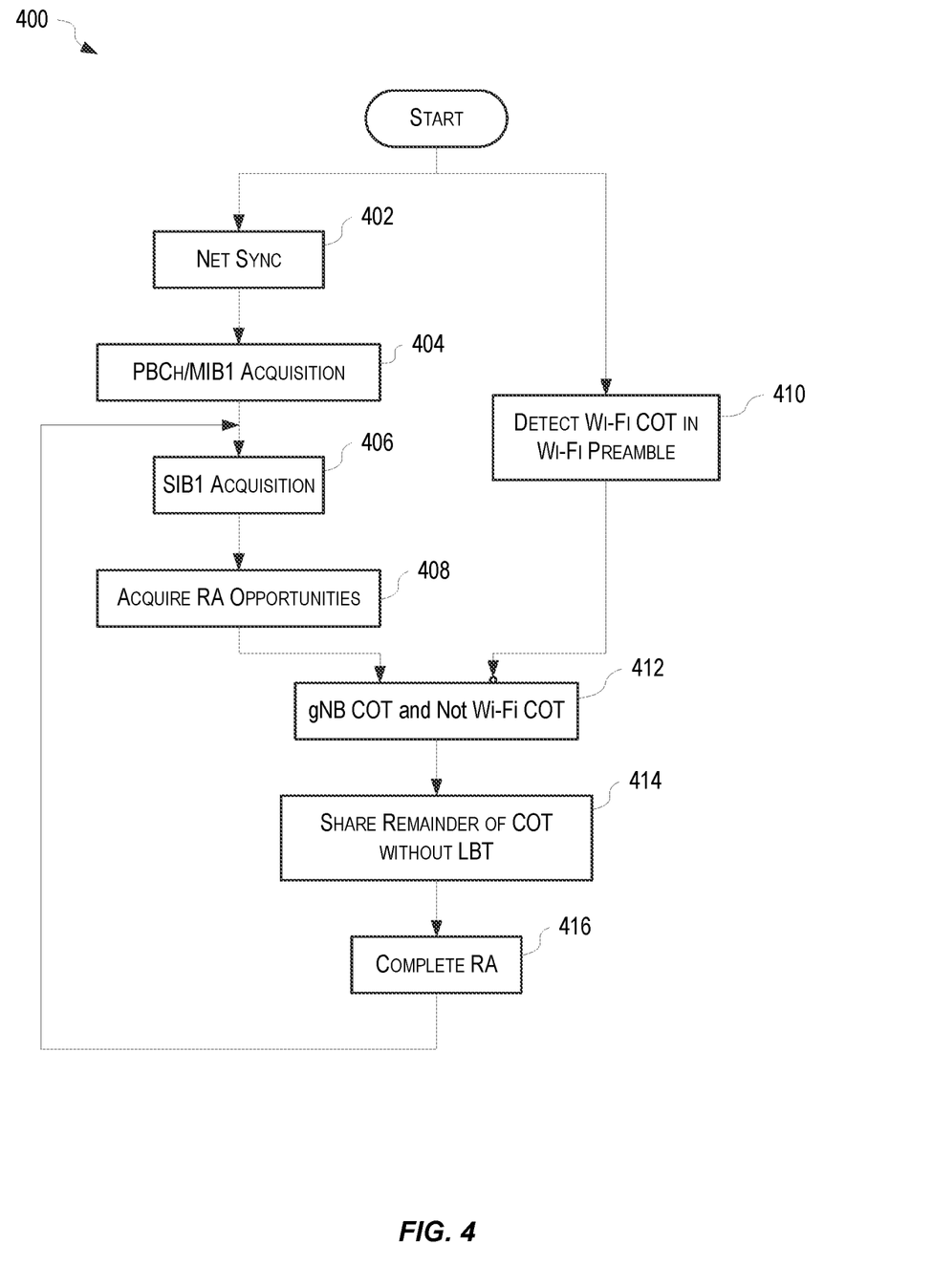
FIG. 4 is a flowchart illustrating one example procedure for an NR-U UE to connect to a cell of a 5G NR-U wireless network by sharing a gNB COT, in an embodiment.

FIG. 4 is a flowchart illustrating one example procedure 400 for an NR-U UE to connect to a cell of a 5G NR-U wireless network by sharing a gNB COT. Procedure 400 may be implemented in NR-U UE 202, and illustrates NR-U UE 202 communicating with gNB 204 to join 5G NR-U network 208, as shown in FIG. 2. Particularly, NR-U UE 202 may connect to one cell of 5G NR-U network 208 that has a specific cell ID.

NR-U UE 202 may use the Synchronization Sequence Block (SSB) sequence to synchronize with timing and frequency of the cell of 5G NR-U network 208. In block 402, the NR-U UE synchronizes with the NR-U gNB 204. In one example of block 402, NR-U UE 202 receives broadcast information transmissions of 5G NR-U network 208. In block 404, the NR-U UE acquires PBCh/MIB1. In one example of block 404, NR-U UE 202 acquires and decodes at least one master information block (MIB). In block 406, the NR-U UE acquires at least the SIB information. In one example of block 406, the NR-U UE 202 acquires and decodes the SIB information received from gNB 204 and determines the next RA opportunity. The COT information may be transmitted in the common preamble, PBCH, PDCCH channels. However, in a given DL burst transmitted during an acquired COT, there may not be a PBCH, in which case the NR-U UE processes a common portion of PDCCH. That is, in some cases, the NR-U UE evaluates PBCH and/or common PDCCH depending on the signals received. In block 408, the NR-U UE acquires RA opportunities. In one example of block 408, in certain embodiments, NR-U UE 202 decodes the RA timing opportunity from at least the SIB information.

In certain embodiments, block 410 may occur in parallel with blocks 402, 404, 406, and 408. In other embodiments, block 410 may occur after block 406 or after block 408. In block 410, the NR-U UE detects Wi-Fi COT in a preamble of a received Wi-Fi transmission. In one example of block 410, NR-U UE 202 detects (e.g., listens for) Wi-Fi transmission from Wi-Fi STA 222 and Wi-Fi AP 224, processing the Wi-Fi preambles of detected transmissions to determine Wi-Fi utilization of the shared unlicensed band 240. In another example of block 410, NR-U UE 202 does not detect any Wi-Fi transmission.

In block 412, the NR-U UE determines that the RA opportunity of block 408 is within a gNB COT and that it is not (as indicated by the 'not' input symbol at the arrow from block 410) within any Wi-Fi COT detected in block 410. In one example of block 412, NR-U UE 202 calculates a time availability (Ta) for transmitting a PRACh message based on the gNB COT and proceeds to block 414 if RA opportunity does not fall within any Wi-Fi COT. In other embodiments (see FIG. 5), the NR-U UE may acquire its own COT by using a new CCA procedure initiated by the NR-U UE. As shown in the example of FIG. 3, in this embodiment, the NR-U UE may transmit PRACh Mssg 1 on the first available symbol that complies simultaneously with all the following conditions: the symbol is part of a gNB COT but not overlapping with an NR-U DL part of the gNB COT, the symbol is not part of a coexistent Wi-Fi COT, and the symbol is part of an RA opportunity supported by gNB.

In block 414, the gNB shares the remainder of the COT with the NR-U UE such that LBT is not required. In one example of block 414, NR-U UE 202 calculates a time availability (Ta) for transmitting the RA message within an unused portion of the gNB COT (and not overlapping the NR-U DL part of the COT) and transmits an RA message within the remaining COT without using the LBT procedure.

In block 416, the NR-U UE completes the RA. In one example of block 416, the NR-U UE 202 completes the RA exchange with gNB 204 to join 5G NR-U network 208. Procedure 400 then returns to block 406 to determine further RA opportunities by reading subsequent SIB information, since RA opportunity allocation is a semi-static process.

Figure 5:
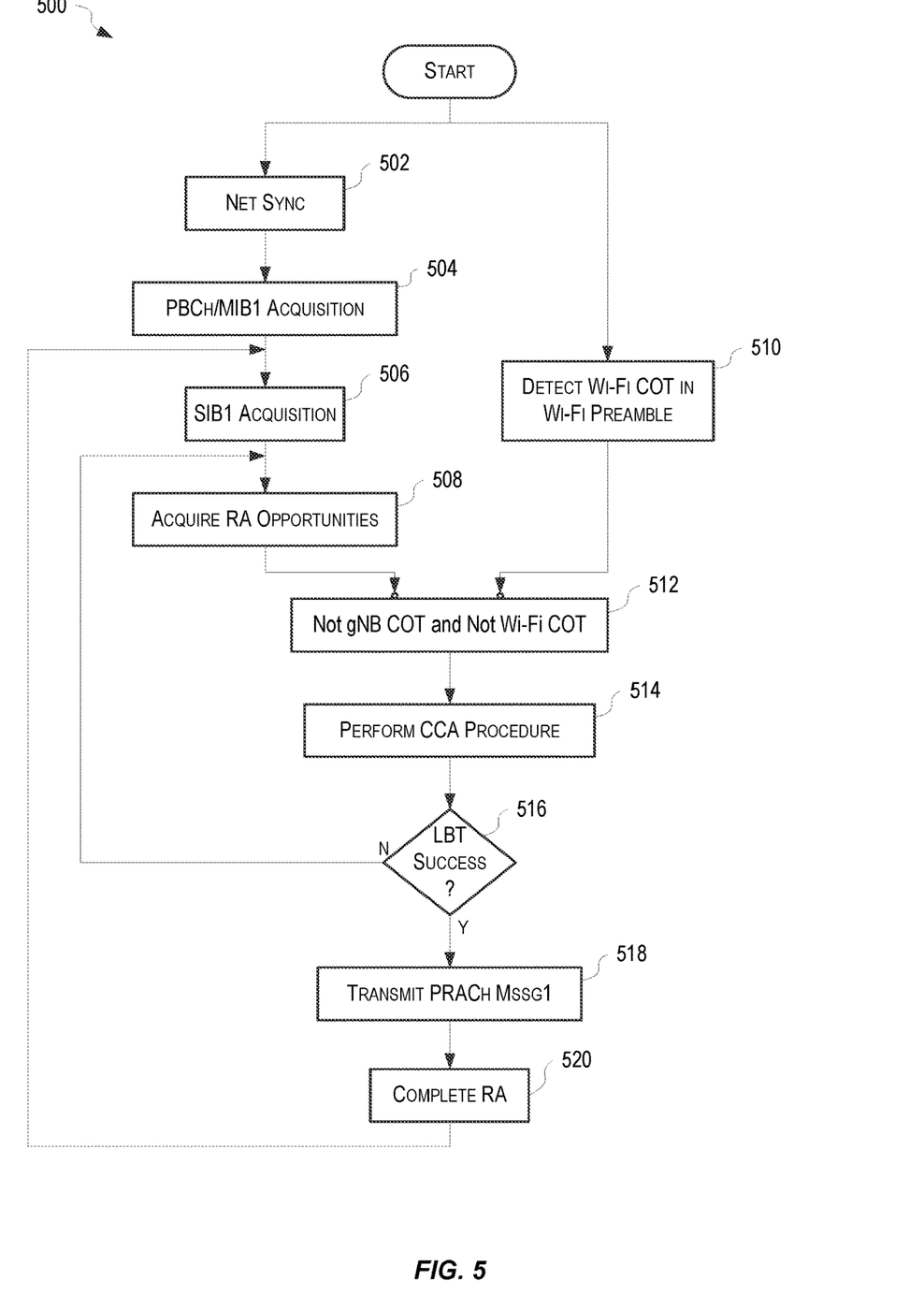
FIG. 5 is a flowchart illustrating one example procedure for an NR-U UE to connect to a cell of a 5G NR-U wireless network by generating its own COT, in an embodiment.

FIG. 5 is a flowchart illustrating one example procedure 500 for an NR-U UE to connect to a cell of a 5G NR-U wireless network by generating its own COT. Procedure 500 may be implemented in NR-U UE 202, and illustrates NR-U UE 202 communicating with gNB 204 to join 5G NR-U network 208 as shown in FIG. 2. Particularly, NR-U UE 202 may connect to one cell of 5G NR-U network 208 that has a specific cell ID.

NR-U UE 202 may use the Synchronization Sequence Block (SSB) sequence to synchronize with timing and frequency of the cell of 5G NR-U network 208. In block 502, the NR-U UE synchronizes with the NR-U gNB 204. In one example of block 502, NR-U UE 202 receives broadcast information transmissions of 5G NR-U network 208. In block 504, the NR-U UE acquires PBCh/MIB1. In one example of block 504, NR-U UE 202 acquires and decodes at least one master information block (MIB). In block 506, the NR-U UE acquires the SIB information. In one example of block 506, the NR-U UE 202 acquires and decodes the SIB information received from gNB 204 and determines the next RA opportunity. The COT information may be transmitted in the common preamble, PBCH, PDCCH channels. However, in a given DL burst transmitted during an acquired COT, there may not be a PBCH, in which case the NR-U UE processes a common portion of PDCCH. That is, in some cases, the NR-U UE evaluates PBCH and/or common PDCCH depending on the signals received. In block 508, the NR-U UE acquires RA opportunities. In one example of block 508, NR-U UE 202 decodes the RA timing opportunity from the SIB information.

In certain embodiments, block 510 may occur in parallel with blocks 502, 504, 506, and 508. In other embodiments, block 510 may occur after block 506 or after block 508. In block 510, the NR-U UE detects Wi-Fi COT in a preamble of a received Wi-Fi transmission. In one example of block 510, NR-U UE 202 detects (e.g., listens for) Wi-Fi transmission from Wi-Fi STA 222 and Wi-Fi AP 224, processing the Wi-Fi preambles of detected transmissions to determine Wi-Fi utilization of the shared unlicensed band 240. In another example of block 510, NR-U UE 202 does not detect any Wi-Fi transmission.

In block 512, the NR-U UE determines that the RA opportunity of block 508 is not (as indicated by the 'not' input symbol at the arrow from block 508) within a gNB COT and that it is not (as indicated by the 'not' input symbol at the arrow from block 510) within any Wi-Fi COT detected in block 510. In one example of block 512, NR-U UE 202 calculates a time availability (Ta) for transmitting a PRACh message based on the gNB COT and proceeds to block 514 if RA opportunity does not fall within any Wi-Fi COT. In other embodiments (see FIG. 4), the NR-U UE may share the gNB COT. As shown in the example of FIG. 3, in this embodiment, the NR-U UE may transmit PRACh Mssg 1 on the first available symbol that complies simultaneously with all the following conditions: the symbol is not part of a gNB COT, the symbol is not part of a coexistent Wi-Fi COT, and the symbol is part of a RA opportunity supported by gNB.

In block 514, the NR-U UE performs a CCA procedure. In one example of block 514, NR-U UE 202 performs the CCA procedure (e.g., LBT) to determine whether the channel is occupied by another transmission. Block 516 is a decision. If, in block 516, the NR-U UE determines that the LBT is successful (e.g., there are no transmission detected on the channel), procedure 500 continues with block 518; otherwise, procedure 500 continues with block 508 to determine other RA opportunities.

In block 518, the NR-U UE transmits PRACh Mssg1. In one example of block 518, the NR-U UE 202 transmits PRACh Mssg1 to gNB 204. In block 520, the NR-U UE completes the RA. In one example of block 520, the NR-U UE 202 completes the RA exchange with gNB 204 to join 5G NR-U network 208. Procedure 500 then returns to block 506 to determine further RA opportunities by reading subsequent SIB information, since RA opportunity allocation is a semi-static process.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An assisted random-access procedure to share a band with Wi-Fi, comprising:
   receiving, by User Equipment (UE), a first wireless transmission using a first protocol;
   decoding the first wireless transmission to determine a first channel occupancy time (COT);
   receiving, by the UE, a Wi-Fi wireless transmission;
   decoding the Wi-Fi wireless transmission to determine a Wi-Fi COT;
   determining a random access (RA) opportunity based upon the first COT; and
   transmitting, during the RA opportunity, a physical random-access channel (PRACh) message from UE to a base station when (a) the RA opportunity does not occur during the first COT or the Wi-Fi COT, or (b) the first COT is from the base station and the RA opportunity occurs within a remainder of the first COT, and the RA opportunity does not occur within the Wi-Fi COT;
   the step of transmitting further comprising performing listen-before-talk (LBT) when (c) the RA opportunity is not within the first COT and when (d) the RA opportunity is within the first COT but the first COT is not generated by the base station.

2. The assisted random-access procedure of claim 1, the LBT comprising performing clear channel assessment (CCA) to determine that a transmission channel is clear of other transmissions prior to transmitting the PRACh message.

3. The assisted random-access procedure of claim 1, further comprising determining that the first COT is generated by the base station when a NR-U common preamble of the first wireless transmission indicates that a transmission of the first wireless transmission is from the base station.

4. The assisted random-access procedure of claim 1, further comprising:
   determining that the PRACh message is not successful; and
   repeating the steps of acquiring, detecting, decoding the Wi-Fi preamble, performing, and transmitting when the PRACh message is not successful.

5. The assisted random-access procedure of claim 1, the step of acquiring the RA opportunity comprising calculating a time availability (Ta) for transmitting the PRACh message based, at least in part, upon the first wireless transmission.

6. The assisted random-access procedure of claim 1, further comprising generating a common preamble having, at least in part, a Wi-Fi preamble format decodable by existing Wi-Fi devices, wherein the common preamble is included in transmissions from the UE and transmissions from the base station.

7. An assisted random-access procedure for New Radio Unlicensed (NR-U) to share a band with Wi-Fi, comprising:
- receiving, by User Equipment (UE), a first wireless transmission;
- decoding the first wireless transmission to determine a first channel occupancy time (COT);
- detecting, by the UE, a Wi-Fi wireless transmission including a Wi-Fi preamble;
- decoding the Wi-Fi preamble to determine a Wi-Fi COT;
- determining a random access (RA) opportunity based upon the first wireless transmission; and
- transmitting, during the RA opportunity, a PRACh message from the UE to a base station when (a) the RA opportunity does not occur during the first COT or the Wi-Fi COT, or (b) the first COT is from the base station and the RA opportunity occurs within a remainder of the first COT, and the RA opportunity does not occur within the Wi-Fi COT;
- the PRACh message transmitting without listen-before-talk (LBT) when both (c) the RA opportunity occurs during a remainder of the first COT and (d) the first COT is generated by the base station.

8. The assisted random-access procedure of claim 7, wherein transmission of the PRACh message does not overlap a downlink part of the NR-U COT.

9. The assisted random-access procedure of claim 7, further comprising determining that the first COT is generated by the base station when a NR-U common preamble of the first wireless transmission indicates a transmission direction of the first wireless transmission is from the base station.

10. The assisted random-access procedure of claim 7, further comprising:
- determining that the PRACh message is not successful; and
- repeating the steps of acquiring, detecting, decoding the Wi-Fi preamble, performing, and transmitting when the PRACh message is not successful.

11. The assisted random-access procedure of claim 7, the step of acquiring the RA opportunity comprising calculating a time availability (Ta) for transmitting the PRACh message based, at least in part, upon the first wireless transmission.

12. The assisted random-access procedure of claim 7, further comprising generating a common preamble having, at least in part, a Wi-Fi preamble format decodable by existing Wi-Fi devices, wherein the common preamble is included in transmissions from the UE and transmissions from the base station.

13. The assisted random-access procedure of claim 7, wherein the step of transmitting further comprises performing listen-before-talk (LBT) when (e) the RA opportunity is not within the first COT and when (f) the RA opportunity is within the first COT but the first COT is not generated by the base station.

* * * * *